United States Patent
Brown et al.

(10) Patent No.: US 10,530,869 B2
(45) Date of Patent: Jan. 7, 2020

(54) BIDIRECTIONAL FORWARDING DETECTION ACCELERATOR

(71) Applicant: Arista Networks, Inc., Santa Clara, CA (US)

(72) Inventors: Travis Brown, Santa Clara, CA (US); Saravanan Sellappa, Santa Clara, CA (US); Robert E. Gilligan, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 610 days.

(21) Appl. No.: 14/878,834

(22) Filed: Oct. 8, 2015

(65) Prior Publication Data
US 2017/0104828 A1   Apr. 13, 2017

(51) Int. Cl.
*H04L 29/08*   (2006.01)
*H04L 12/24*   (2006.01)

(52) U.S. Cl.
CPC ........ *H04L 67/142* (2013.01); *H04L 41/0816* (2013.01); *H04L 67/145* (2013.01)

(58) Field of Classification Search
CPC . H04L 41/0604; H04L 41/0816; H04L 43/10; H04L 67/142; H04L 67/145
See application file for complete search history.

(56) References Cited

U.S. PATENT DOCUMENTS

| | | | | |
|---|---|---|---|---|
| 7,860,981 B1 * | 12/2010 | Vinokour | ................ | G06F 15/16 370/241 |
| 2009/0031029 A1 * | 1/2009 | Rice | .................... | H04L 65/1073 709/227 |
| 2009/0279542 A1 * | 11/2009 | Wong | .................. | H04L 41/0631 370/389 |
| 2013/0343174 A1 * | 12/2013 | Guichard | ................ | H04L 45/22 370/218 |
| 2014/0157367 A1 * | 6/2014 | Zhang | | |
| 2015/0326471 A1 * | 11/2015 | Anandan | ............. | H04L 12/4633 370/228 |
| 2016/0036694 A1 * | 2/2016 | Abdul | ..................... | H04L 43/10 370/244 |

* cited by examiner

Primary Examiner — Gil H. Lee
(74) *Attorney, Agent, or Firm* — Chamberlain, Hrdlicka, White, Williams & Aughtry

(57) ABSTRACT

A network device for performing bidirectional forwarding detection (BFD) includes a processor that receives packets from a peer; a session state machine that manages a session with the peer; a receive module that determines whether the packet indicates no change to the session; and a transmit module. The transmit module transmits BFD packets at an interval determined by the session state machine and transmits a session change packet in response to a configuration update by the session state machine.

14 Claims, 7 Drawing Sheets

BIDIRECTIONAL FORWARDING DETECTION ACCELERATOR

BACKGROUND

A network may include a number of network infrastructure components. The network infrastructure components may communicate with each other using various protocols. Each network infrastructure component may forward packets to enable network infrastructure components to communicate that do not have a direct connection.

Overtime, network infrastructure components may go offline and new network infrastructure component may go online As network infrastructure components go on or offline, the routes that packets need to traverse may change.

SUMMARY

In one aspect, a method of performing bidirectional forwarding detection in accordance with one or more embodiments of the invention may include retrieving, by a receive module operating in a data plane of a network device, a first packet from a network processor of the network device; determining, by the receive module, that the first packet is a BFD packet; determining, by the receive module, that the first packet indicates no change to a session managed by a session state machine of the network device; and resetting, by the receive module, a session timer of the network device in response to determining that the first packet indicates no change to the session.

In one aspect, a network device for performing bidirectional forwarding detection in accordance with one or more embodiments of the invention may include a processor that receives packets from a peer; a session state machine that manages a session with the peer; a receive module that determines whether the packet indicates no change to the session; and a transmit module that transmits BFD packets at an interval configured by the session state machine and transmits a session change packet in response to a configuration update by the session state machine.

In one aspect, a non-transitory computer readable medium (CRM) in accordance with one or more embodiments of the invention may store instructions including functionality for retrieving, by a receive module operating in a data plane of a network device, a first packet from a network processor of the network device; determining, by the receive module, that the first packet is a BFD packet; determining, by the receive module, that the first packet indicates no change to a session managed by a session state machine of the network device; and resetting, by the receive module, a session timer of the network device in response to determining that the first packet indicates no change to the session.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to a method and system for network communications. More specifically, one or more embodiments of the invention may enable a network device to detect when a peer network device (also referred to as "peer") goes offline. The network device may change how it forwards packets in response to the network device detecting that the peer is offline.

In one or more embodiments of the invention, a network device may perform bidirectional forwarding detection to determine when a peer goes offline To perform bidirectional forwarding detection, the network device may establish a connection with a peer. The network device may periodically send packets to the peer. If a response packet is not received from the peer within a predetermined period of time, the network device may determine that the peer is no longer online.

To perform bidirectional forwarding detection, the network device may include one or more session state machines and an accelerator. Each state machine may manage a connection with an associated peer and configure the accelerator based on the associated peer. The accelerator may periodically send packets a peer associated with one of the state machines. The accelerator may be further configured to identify packets sent from peers associated with the one or more state machines and received by the network device. In response to identifying a packet, the accelerator may forward the packet to an associated state machine for analysis.

In one or more embodiments of the invention, the accelerator may detect a failure of a connection based on a timeout of a timer of the accelerator. The timer may be set to count for a predetermined period of time when a bidirectional forwarding detection session associated with a peer is initiated by the network device. The accelerator may reset the timer when a packet from the associated peer is received by the network device. If a packet from the associated peer is not received by the network device before the timer reaches the limit, the accelerator may determine the connection with the peer failed.

Figure 1:
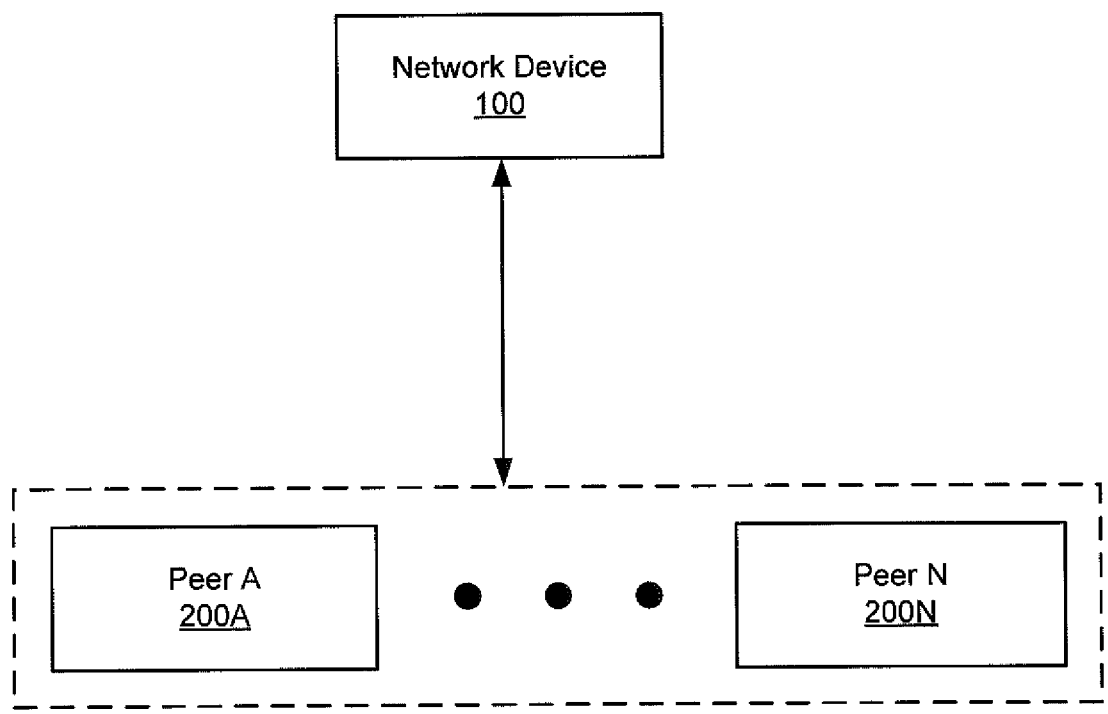
FIG. 1 shows a system in accordance with one or more embodiments of the invention.

FIG. 1 shows a system in accordance with one or more embodiments of the invention. The system shown in FIG. 1 may be used, for example, to perform network communications. The system includes one or more network devices (100) and one or more peers (200A-200N). Each of these components is described below.

In one embodiment of the invention, a peer (200A-200N) may be a network infrastructure component. A peer (200A-200N) may be, for example, a router, switch, server, or other device that supports network communications. Each peer (200A-200N) may be configured to transmit and receive packets in accordance with one or more networking protocols. In one embodiment of the invention, a peer (200A-200N) may be operatively connected to the network device (100) and zero, one, or more other peers (200A-200N).

Figure 2:
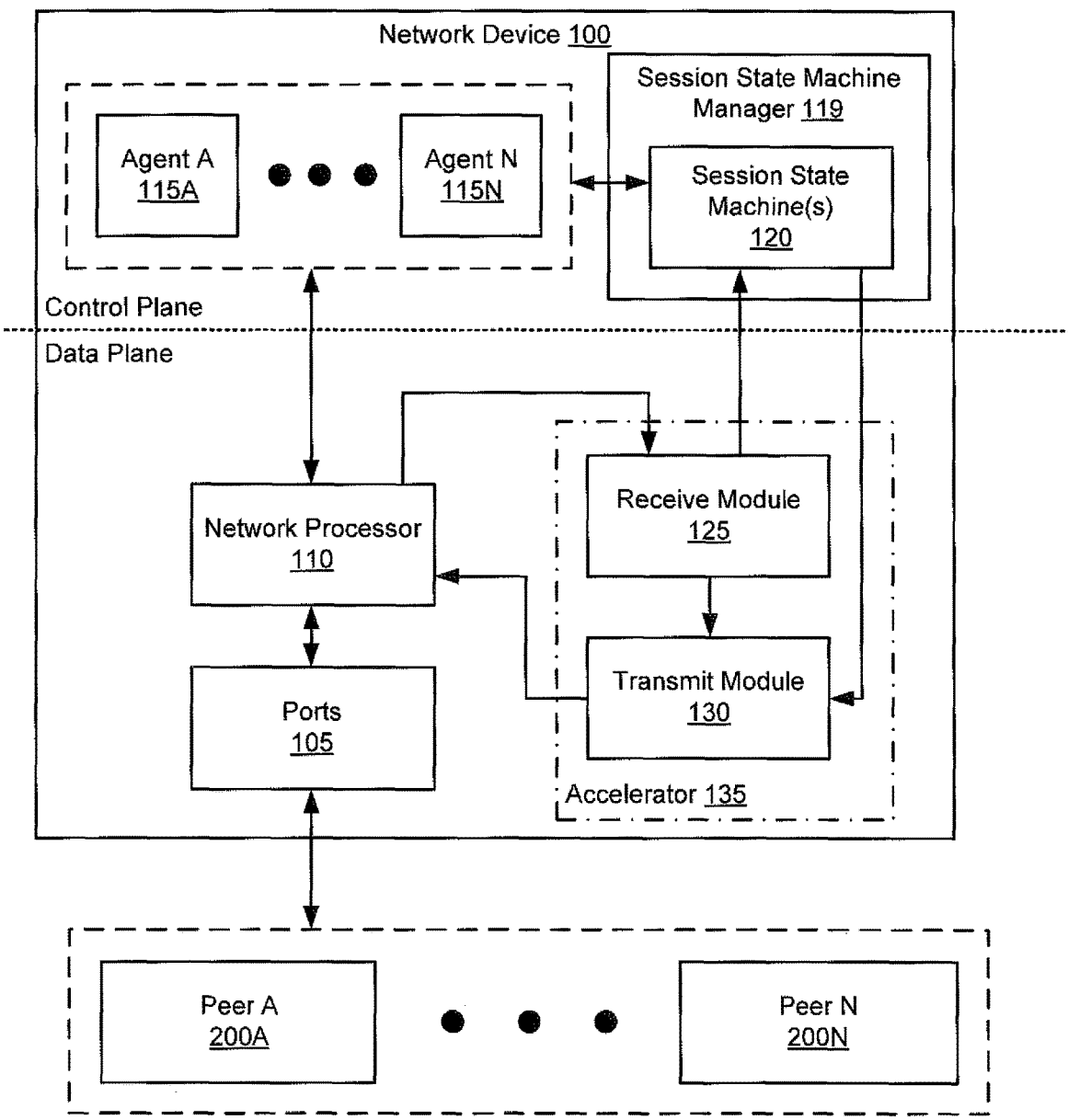
FIG. 2 shows network device in accordance with one or more embodiments of the invention.

In one or more embodiments of the invention, the network device (100) is a physical device. FIG. 2 shows a network device (100) in accordance with one or more embodiments of the invention. The network device (100) may be, for example, a router, switch, a multi-layer switch, server, or other device that supports network communications. The network device (100) may be configured to implement one or more network communication protocols. More specifically, the network device (100) may be configured to forward packets, determine when peers go offline, and update packet forwarding in response to peers going offline.

In one or more embodiments of the invention, the network device (100) includes non-transitory storage, memory (e.g. Random Access Memory), and one or more processors. An operating system may be stored on the non-transitory storage and executed by the one or more processors in the network device. The operating system may manage the operation of the network device (100) and provide resource access to other programs executing on the network device (100). The non-transitory storage may also include instructions, which when executed by the one or more processors enable the network device to perform the functions described below and shown in FIGS. 3-6.

The network device (100) may include ports (105), a network processor (110), one or more agents (115A-115N), a session state machine manager (119), one or more session state machine(s) (120), a receive module (125), and a transmit module (130). Each of the components is described below.

The network device (100) may include ports (105) that provide an operative connection to the peers (200A-200N). The ports (105) may be operatively connected to the network processor (110) and to the peers (200A-200N) by a network.

The network processor (110) may be a physical device configured to send and/or receive packets to and/or from a network. The network processor (100) may be, for example, a discrete processor, a digital signal processor, an application specific integrated circuit (ASIC), a switch ASIC, a field programmable gate array, a microcontroller, any other type of circuitry configured to send and receive packets, or any combination thereof. The network processor (110) may include one or more registers for storing received packets and/or to-be-sent packets.

The network processor (110) may include logic configured to forward received packets to one or more agents (115A-115N) of the network device or to a peer (200A-200N). The network processor (110) may forward packets based, e.g., on at least a portion of a header of the packet.

The network device (100) may include one or more agents (115A-115N). The agents may provide an interface for forwarding data included in received packets to programs (not shown) executing on the network device (100). More specifically, the agents (115A-115N) may be configured to receive packets from the network processor (110) and provide the packets (or data stored therein) to one or more programs executing on the network device. The one or more agents (115A-115N) may operate in a control plane of the network device (100).

In one or more embodiments of the invention, the agents (115A-115N) may be programs stored on the non-transitory storage of the network device (100). The agents (115A-115N) may be a program or process of the operating system stored on the non-transitory storage of the network device (100).

The network device (100) may include a session state machine manager (119). The session state machine manager (119) may be a program stored on a non-transitory storage of the network device and executing on the network device. The session state machine manager (119) may manage communications between one or more session state machines (120) and the receive module (125) and the transmit module (130). The session state machine manager (119) may also manage communications between the one or more agents (115A-115N) and the one or more session state machines (120).

In one or more embodiments of the invention, there may be more than one receive module (125) and more than one transmit module (130). For example, a first pair of a receive module and a transmit module may be managed by a first session state machine while a second pair of a receive module and a transmit module may be managed by a second state machine. Any number of pairs of transmit and receive modules may exist to perform bidirectional forwarding detection without departing from the invention.

The network device (100) may include one or more session state machines (120) executing within the control plane. The session state machines may be programs or processes managed by the session state machine manager (119). In one or more embodiments of the invention the session state machines (120) may be independent programs stored on the non-transitory storage of the network device (100) and executable by the one or more processors. Each session state machine may be instantiated by the session state machine manager (119) in response to a program requesting to communicate with a peer (200A-200N).

Each session state machine may be configured to monitor the connection between the network device (100) and a peer (200A-200N). More specifically, each session state machine (100) may be associated with the receive module (125) and the transmit module (130) operating in the data plane of the network device (100). The session state machines (120) may be configured to perform the methods shown in FIGS. 3-6.

The receive module (125) and transmit module (130) may be configured to monitor the status of a peer (200A-200N). The receive module (125) and transmit module (130) may monitor the status of a network infrastructure component by the methods shown in FIGS. 4-6.

In one or more embodiments of the invention, the receive module (125) and transmit module (130) may be a portion of an operating system of the network device. In other words, the functionality of the receive module (125) and transmit module (130) may be part of an operating system executing on the network device.

In one or more embodiments of the invention, the receive module (125) and transmit module (130) may be a hardware accelerator (135) operating in the data plane of the network device. The accelerator (135) may be a discrete processor, digital signal processor, application specific integrated circuit, field programmable gate array, microcontroller, any other type of embedded circuitry, or any combination thereof.

In one or more embodiments of the invention, the receive module (125) and transmit module (130) may be a program stored on the non-transitory storage of the network device, executable by the processor, and operating in the data plane of the network device.

Those skilled in the art will appreciate that the invention is not limited to the architecture shown in FIGS. 1-2.

In the following flowcharts, functionality of components of the system shown in FIGS. 1-2 will be described. The functionality shown in the following figures may enable, for example, a network device to monitor the online status of a peer. FIGS. 3-6 show flowcharts of methods that may be performed by, for example, a network device. Additionally, the methods shown in FIGS. 3-6 may be performed at any time by a network device and in some cases they may be performed concurrently.

Figure 3:
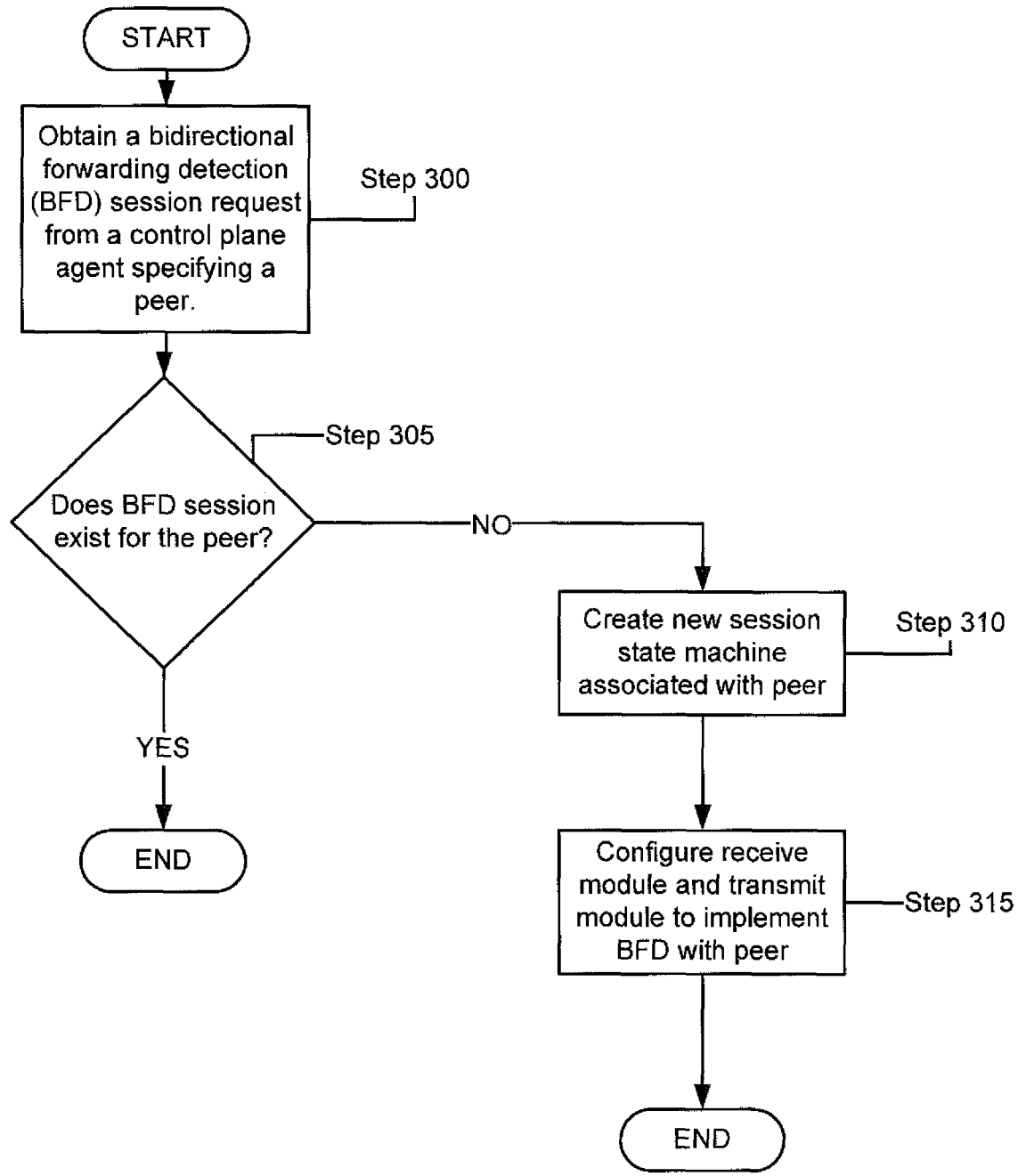
FIG. 3 shows method of configuring a session state machine, transmit module, and/or receive module in accordance with one or more embodiments of the invention.

FIG. 3 shows a flowchart in accordance with one or more embodiments of the invention. The method depicted in FIG. 3 may be used to instantiate a session state machine, receive module, and/or transmit module to perform bidirectional forwarding detection in accordance with one or more embodiments of the invention. One or more steps shown in FIG. 3 may be omitted, repeated, and/or performed in a different order among different embodiments.

In Step 300, an operating system of a network device receives a bidirectional forwarding detection (BFD) session request from an agent. The agent may be a component of a network device as illustrated in FIG. 2. The operating system may obtain the BFD session request via a message from the agent. The agent may send the request in response to an agent receiving a request from an associated program to communicate with a peer. The operating system may interpret the aforementioned request as a request to initiation a BFD session.

In Step 305, the operating system determines if a session state machine associated with the peer already exits. The operating system may determine if a session state machine associated with the peer exists by querying a session state machine manager of the network device that manages each session state machine executing on the network device. If the session state machine exists, the method may end. If the session state machine does not exist, the method proceeds to Step 310.

In Step 310, the session state machine manager instantiates a new session state machine associated with the peer. Once the session state machine is instantiated, a receive module and a transmit module associated with the session state machine are instantiated in a data plane of the network device. In the event that a receive module and transmit module already exist in the data plane, the methods proceeds to Step 315 without instantiating a receive module or transmit module. In one or more embodiments of the invention, the receive module and transmit module are instantiated by the session state machine manager. In one or more embodiments of the invention, the receive module and transmit module are instantiated by the operating system of the network device.

In Step 315, the receive module and transmit module are configured by the session state machine to implement BFD. More specifically, the transmit module is configured to instantiate and sent packets to the peer to implement BFD. The receive module is configured to identify packets received by the network processor from the peer. The method may end following Step 315.

The process of instantiating a session state machine, receive module, and/or transmit module to perform bidirectional forwarding detection by the method shown in FIG. 3 is further described using an explanatory example. The following example is for explanatory purposes and is not intended to limit the scope of the technology.

EXAMPLE 1

A network device may be connected to a first peer and a second peer by a network. The network device may include a bidirectional forwarding detection session (BFDS) with a first peer.

A program including instructions stored on a non-transitory storage of a network device and being executed by a processor of the network device may make a request to the network device to communicate with the first peer. More specifically, the program may make a request to an agent of an operating system of the network device to communicate with the first peer.

In response to the request, the agent may send a request to a session state machine manager or operating system of the network device to determine if a BFDS associated with the first peer is currently executing on the network device.

In response to the request from the agent, the session state machine manager or operating system may determine a BFDS session with the first peer is executing on the peer and notify the agent of the BFDS.

The program may make a second request to the network device to communicate with the second peer. More specifically, the program may make a request to an agent of an operating system of the network device to communicate with the second peer.

In response to the second request, the agent may send a request to a session state machine manager or the operating system of the network device to determine if a BFDS associated with the second peer is currently executing on the network device.

In response to the second request from the agent, the session state machine manager or operating system may make a second determination that a BFDS session with the second peer is not executing on the peer.

In response to the second determination, the operating system may instantiate a session state machine associated with the second peer. The second session state machine may manage a second BFDS with the second peer.

The second session state machine may instantiate and/or configure a receive module and/or a transmit module to implement bidirectional forwarding detection with the second peer.

In response to instantiating and/or configuring the receive module and/or the transmit module, the new session state machine may notify the agent of the new BFDS associated with the second peer.

At this stage, the methods shown in FIGS. 4A-6 may be performed.

Figure 4A:
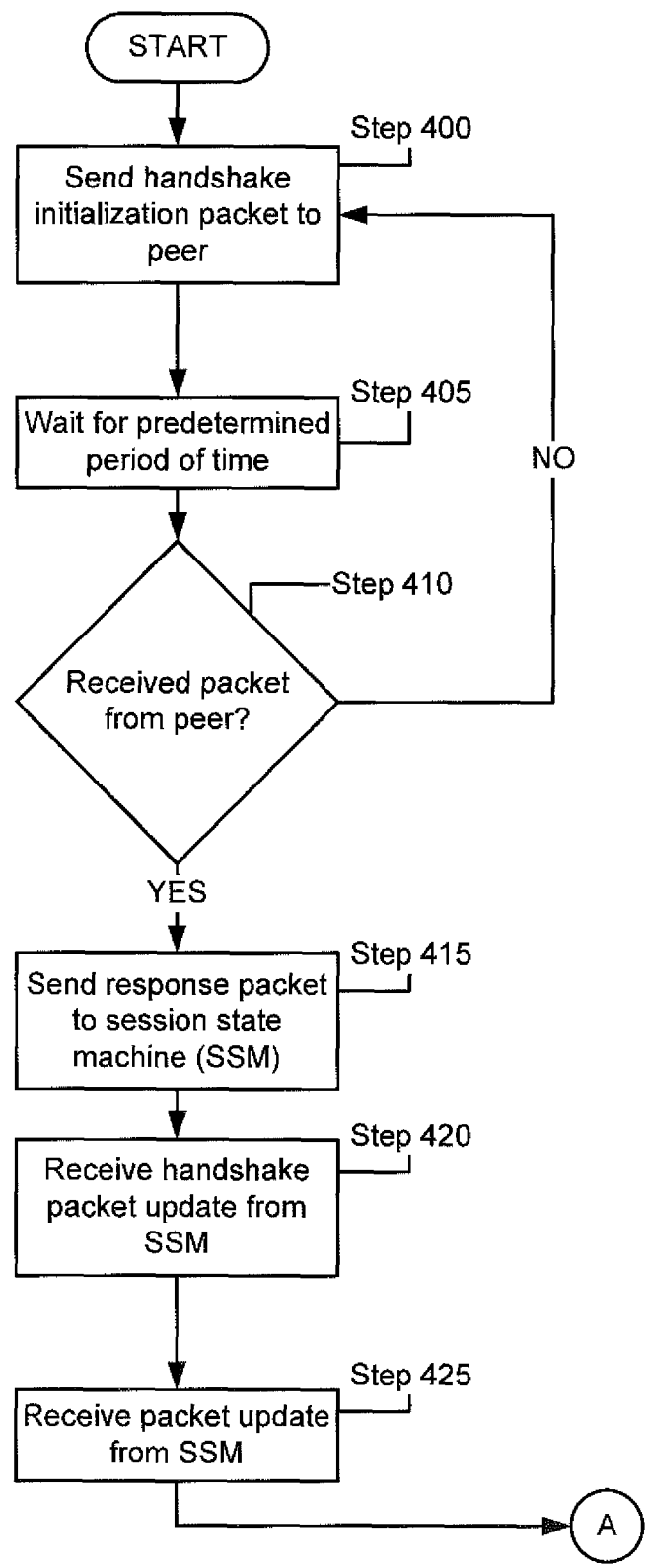
FIG. 4A shows a method of establishing a bidirectional forwarding detection session in accordance with one or more embodiments of the invention.
Figure 4B:
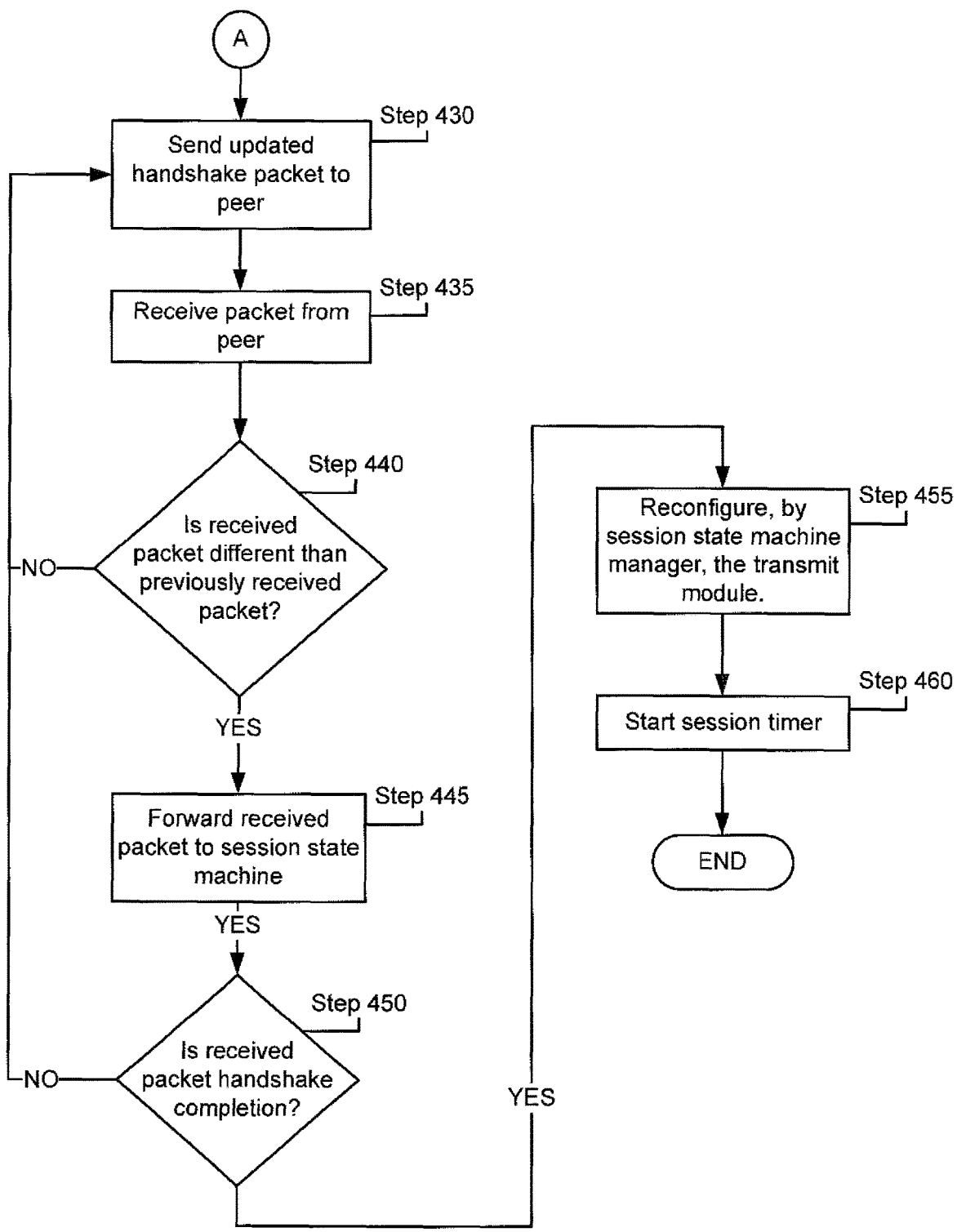
FIG. 4B shows a method of establishing a bidirectional forwarding detection session in accordance with one or more embodiments of the invention.

FIGS. 4A and 4B show a flowchart in accordance with one or more embodiments of the invention. FIG. 4B is a continuation of the flowchart shown in FIG. 4A. The method depicted in FIGS. 4A and 4B may be used to establish a BFDS in accordance with one or more embodiments of the invention. One or more steps shown in FIGS. 4A and 4B may be omitted, repeated, and/or performed in a different order among different embodiments.

In Step 400, a handshake initialization packet is sent to a peer. The packet may be generated and/or sent by the transmit module.

In Step 405, the network device waits for a predetermined period of time. During the predetermined period of time, a receive module of the network device may determine if a response packet has been received from the peer by monitoring the registers of the network processor. The predetermined period of time may be set by the session state machine. The predetermined period of time may be, for example, 500 ms.

In Step 410, the network device determines whether a response packet has been received. If a response packet has been received, the method proceeds to Step 415. If a response packet has not been received, the method proceeds to Step 400.

In Step 415, the receive module forwards the response packet to a session state machine associated with the receive module.

In Step 420, the session state machine generates and forwards a handshake packet update to the transmit module. The handshake packet update changes handshake packets sent by the transmit module to the peer to indicate the network device has received a handshake packet.

In Step 425, the transmit module receives the packet update from the session state machine.

In Step 430, the transmit module sends an updated handshake packet to the peer based on the received packet update in Step 425.

At some later time after step 425, in Step 435, the network processor receives a packet from the peer.

In Step 440, the receive module determines whether the received packet is different than the packet received in Step 410. If the packet is different, the method proceeds to step 445. If the packet is not different, the method proceeds to step 430.

At some later time after step 440, in Step 445, the receive module forwards the packet to the session state machine associated with the bidirectional forwarding detection session associated with the peer from which the packet was received.

In Step 450, the session state machine associated with the peer from which the packet was received determines if the received packet is a handshake completion packet. If the packet is a handshake completion, the method proceeds to step 455. If the packet is not a handshake completion, the method proceeds to step 430.

In Step 455, the session state machine associated with the peer from which the packet was received reconfigures the transmit module based on the packet. In other words, the session state machine reconfigures the transmit module to sends packets to the peer at a predetermined interval based on the packet.

In step 460, the receive module initiates a session timer. The session timer may be set for a predetermined period of time and continue to run after the completion of the method shown in FIG. 4. In one or more embodiments of the invention, the predetermined time may be set based on the packet received from the peer. The method may end following Step 460.

The process of establish a BFDS by the method shown in FIGS. 4A and 4B is further described using an explanatory example. The following example is for explanatory purposes and is not intended to limit the scope of the technology.

EXAMPLE 2

A network device may be connected to a first peer by a network. The network device may be attempting to start a BFDS with the first peer.

To establish the BFDS session, a transmit module of the network device may send a first handshake initialization packet to the first peer. The network device may then wait for a predetermine period of time such as 20 ms. A receive module of the network device may then check a register of a network processor of the network device to determine whether the network device has received a response packet from the first peer.

The receive module may make a first determination that a response packet has not been received from the first peer. The transmit module may send a second handshake initialization packet to the first peer. The network device may then wait for a predetermine period of time such as 20 ms. While waiting, the network processor of the network device may receive a response packet from the first peer.

After waiting the predetermined period of time, the receive module may check the register of the network processor to determine if the network device has received a response packet from the first peer. The receive module may make a second determination that a packet has been received from the first peer.

In response to the second determination, the receive module may send the received packet to a session state machine of the network device.

In response to receiving the response packet, the session state machine may update a handshake packet of the transmit module to indicate the packet has been received.

In response to the updated handshake packet, the transmit module may send the updated handshake packet to the first peer. The network device may wait until a packet is received from the first peer indicating a handshake acknowledgement. More specifically, the receive module may interrogate packets received by the network processor until a packet indicating a handshake acknowledgement from the peer is received.

In response to receiving the handshake acknowledgement, the network device may wait until a packet is received from the first peer that is different from the previously received packet. More specifically, the receive module may interrogate packets received by the network processor until a packet from the peer is received that includes a content that are different from the first packet received from the peer. Once a packet having a different content is received, the receive module may forward the packet to the session state machine.

In response to forwarding the handshake completion packet to the session state machine, the receive module may initiate a session timer associated with the BFDS associated with the first peer.

Figure 5:
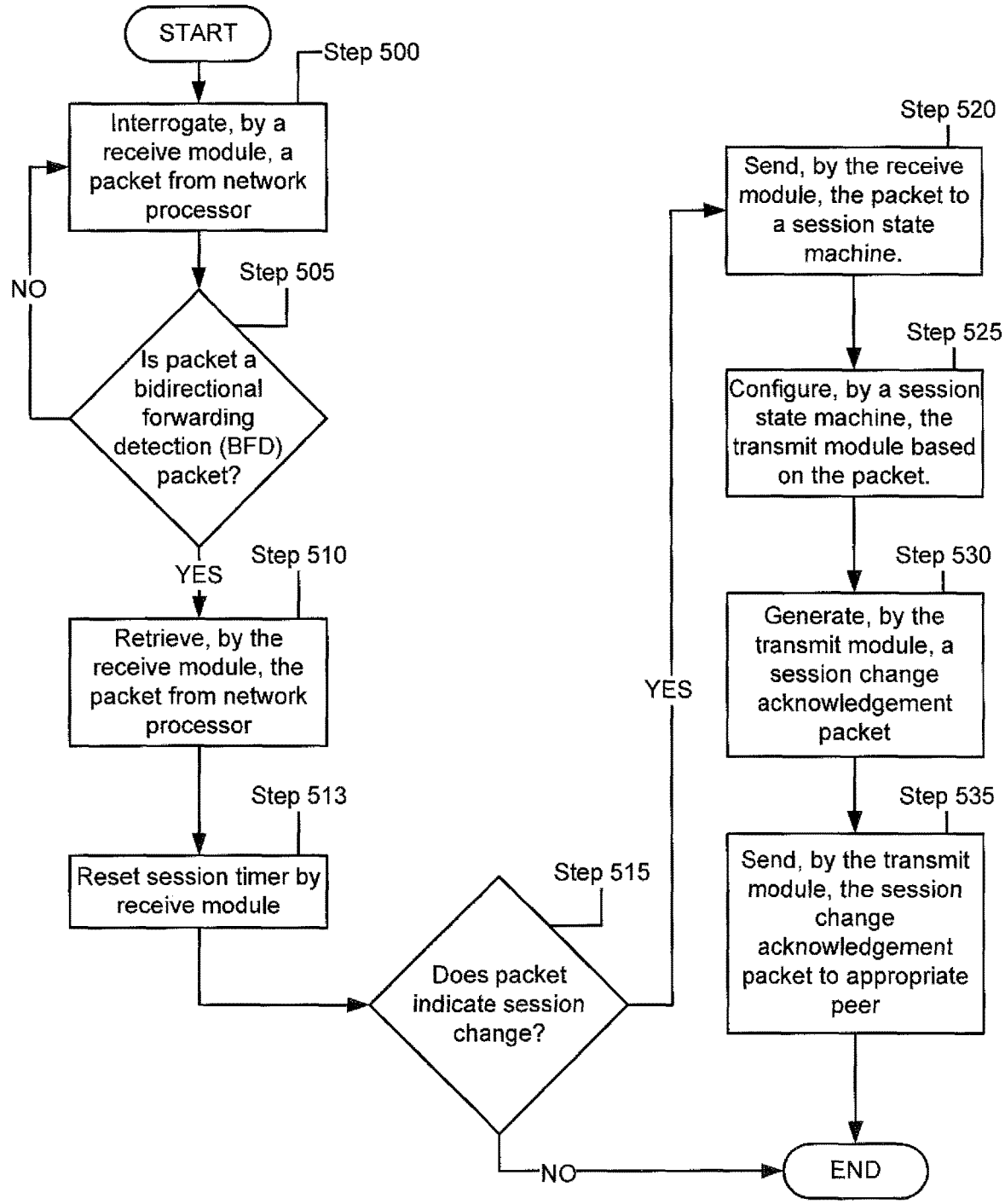
FIG. 5 shows a method of performing bidirectional forwarding detection in accordance with one or more embodiments of the invention.

FIG. 5 shows a flowchart in accordance with one or more embodiments of the invention. The method depicted in FIG. 5 may be used to perform BFD after a BFDS has been initiated per FIGS. 4A-4B in accordance with one or more embodiments of the invention. One or more steps shown in FIG. 5 may be omitted, repeated, and/or performed in a different order among different embodiments.

As noted in Step 455 of FIG. 4B, a transmit module of a network device may be configured to send packets to a peer as part of the initiating the BFDS by the method of FIB. 4B. Thus, in the method shown in FIG. 5, the transmit module may be periodically sending BFD packets to the peer before, during, or after any of the Steps shown in FIG. 5.

In Step 500, a receive module interrogates a packet received by the network processor. The receive module may interrogate the packet by retrieving a copy of the packet from a register of a network processor of the network device.

In Step 505, the receive module determines whether the packet is a BFD packet. The receive module may determine if the packet is a BFD packet based on information included in a header of the packet. If the packet is a BFD packet, the method proceeds to Step 510.

In Step 510, the receive module retrieves the packet from the network processor.

In Step 513, the receive module resets the session timer.

In Step 515, the receive module determines whether the packet indicates a session change. The receive module may determine the packet indicates a session change if, for example, the header indicates the packet routing information has changed. In another example, the packet may indicate a session change if the content of the packet is different than a previously received packet. If the packet indicates a session change, the method proceeds to Step 520. If the packet does not indicate a session change, the method may end following Step 515.

In Step 520, the receive module sends the packet to the session state machine.

In Step 525, the session state machine configures the transmit module based on the packet. The packet may indicate that the peer is no longer online or that the peer requests a change to a parameter of the BFDS such as a packet transmission rate. The session state machine configures the transmit module to reflect either of the aforementioned changes to the BFDS.

In Step 530, the transmit module generates a session change acknowledgement packet.

In Step 535, the transmit module sends the session change acknowledgement packet to the peer. The method may end after Step 535.

The process of performing BFD by the method shown in FIG. 5 is further described using two explanatory examples. The following examples are for explanatory purposes and are not intended to limit the scope of the technology.

EXAMPLE 3

A network device may be connected to a first peer by a network and have a BFDS associated with the first peer. A session timer associated with the BFDS may be executing on the network device.

A receive module of the network device may interrogate packets received by a network processor of the network device until a first packet that is not a BFD packet is received from the peer. The receive module may make a first determination that a first packet received from the first peer is not a BFD packet.

In response to the first determination, the receive module may continue to interrogate packets received by the network processor until a second packet that is a BFD packet is received from the peer. The receive module may make a second determination that the second packet received from the first peer is a BFD packet.

In response to the second determination, the receive module may retrieve the second packet from the network processor. The receive module may then make a third determination that that second packet does not indicate a change to the BFDS. The receive module may reset the session timer in response to the third determination.

EXAMPLE 4

A network device may be connected to a first peer by a network and have a BFDS associated with the first peer. A session timer associated with the BFDS may be executing on the network device.

The receive module may interrogate packets received by the network processor until a packet that is a BFD packet is received from the peer. The receive module may make a first determination that the packet received from the first peer is a BFD packet.

In response to the first determination, the receive module may retrieve the packet from the network processor. The receive module may then make a second determination that that second packet does indicate a change to the BFDS.

In response to the second determination, the receive module may send the packet to a session state machine of the network device associated with the first peer.

The session state machine may configured the transmit module based on a contents of the packet. For example, the contents may indicate a change to the interval between sending BFDS packets by the transmit module.

In response to being configured, the transmit module may generate and send a session change acknowledgement packet to the first peer.

Figure 6:
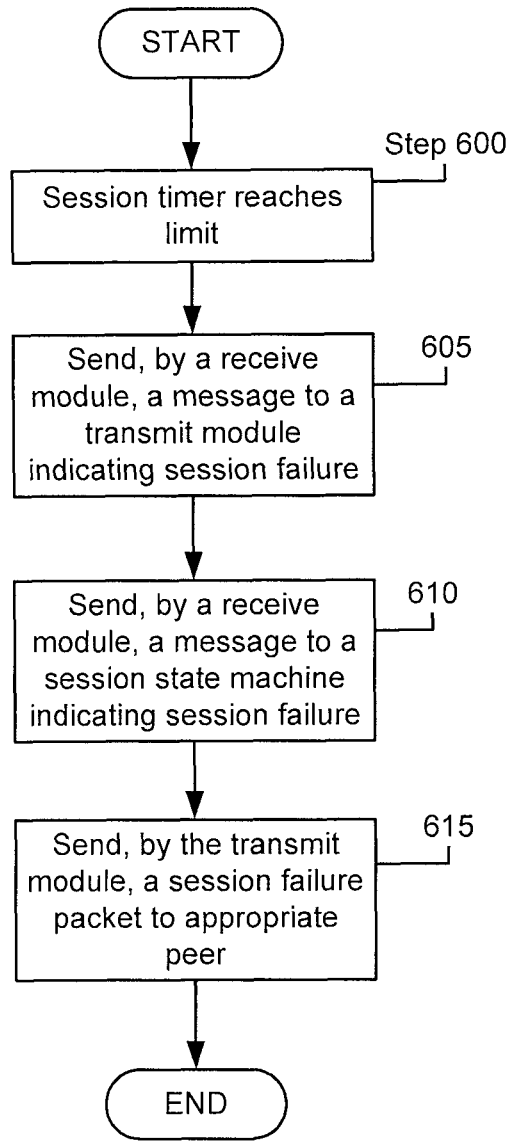
FIG. 6 shows a method of performing bidirectional forwarding detection in accordance with one or more embodiments of the invention.

FIG. 6 shows a flowchart in accordance with one or more embodiments of the invention. The method depicted in FIG. 6 may be used to perform BFD in accordance with one or more embodiments of the invention. One or more steps shown in FIG. 6 may be omitted, repeated, and/or performed in a different order among different embodiments.

As noted in Step 455 of FIG. 4B, a transmit module of a network device may be configured to send packets to a peer as part of the initiating the BFDS by the method of FIB. 4B. Thus, in the method shown in FIG. 5, the transmit module may be periodically sending BFD packets to the peer before, during, or after any of the Steps shown in FIG. 6.

In Step 600, a session timer reaches a limit. The limit may have been previously set by the method shown in FIGS. 4A-4B or reset by the method shown in FIG. 5.

In Step 605, the receive module notifies the transmit module that the session failed in response to the session timer reaching the limit. The receive module may notify the transmit module by sending a message to the transmit module indicating the failure.

In Step 610, the receive module notifies a session state machine that the session failed in response to the session timer reaching the limit. The receive module may notify the session state machine by sending a message to the session state machine indicating the failure.

In Step 615, the transmit module sends a session failure packet to an appropriate peer in response to the notification by the receive module. The appropriate peer may be the peer of the method of FIG. 4.

The process of performing BFD by the method shown in FIG. 6 is further described using an explanatory example. The following example is for explanatory purposes and is not intended to limit the scope of the technology.

EXAMPLE 5

A network device may be connected to a first peer by a network and have a BFDS associated with the first peer. A session timer associated with the BFDS may be executing on the network device.

The session timer may reach a limit. For example, the limit may be 1 second.

In response to the session timer reaching a limit, a receive module operating in a data plane of the network device may notify a transmit module of a session failure. The receive module may also notify a session state machine operating in a control plane of the network device of the session failure.

In response to the notification, the transmit module may send a session failure packet to the first peer indicating the BFDS has failed. Similarly, the session state machine may notify one or more agents or other programs executing on the network device of the session failure.

One or more embodiments of the invention may enable one or more of the following: (i) the use of a receive module and/or a transmit module operating in the data plane of a network device may allow a reduced time between receiving a packet from a peer and sending a response packet and reduce the processing requirements of the control plane; (ii) by reducing the time between receiving a packet from a peer and sending a response packet, the network device may more quickly identify when peer goes offline; (iii) by determining when a peer goes offline more quickly, the network device may change its forwarding behavior more quickly which may reduce the number of packets forwarded to the peer that has gone offline before changing its forwarding behavior; and (iv) separation of portions of BFD into an accelerator and SSMs while maintaining a quick response to a session timing out and the transmitted packets being modified to indicate session failure without the intervention of the SSM.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of performing bidirectional forwarding detection (BFD), comprising:
    retrieving, by a receive module operating in a data plane of a network device, a first BFD packet from a network processor of the network device, wherein the first BFD packet originated at a peer device;
    retrieving, by the receive module, a second BFD packet from the network processor after resetting a session timer, wherein the second BFD packet originated at the peer device;
    performing a direct comparison, by the receive module, between first BFD packet content of the first BFD packet and second BFD packet content of the second BFD packet;
    in response to making a first determination, based on the direct comparison, that second BFD packet content differs from the first BFD packet content, sending, by the receive module, the second BFD packet to a session state machine operating in a control plane of the network device,
    wherein, based on receiving the second BFD packet, the session state machine configures a transmit module to modify a rate at which the transmit module transmits BFD packets to the peer device; and
    in response to making a second determination, based on the direct comparison, that the second BFD packet content does not differ from the first BFD packet content, making a decision, by the receive module, not to send the second BFD packet to the session state machine.

2. The method of claim 1, further comprising:
    retrieving, by the receive module, a packet from the network processor;
    making a third determination, by the receive module, that the packet is not a BFD packet; and
    retrieving, by the receive module, a second packet from the network processor.

3. The method of claim 1, further comprising:
    receiving, by the receive module, a session timer message indicating the session timer reached a limit; and
    sending, by the receive module, a message to the transmit module indicating a session failed.

4. A network device for performing bidirectional forwarding detection (BFD), comprising:
    a network processor configured to receive a plurality of packets from a peer device;
    a session state machine operating in a control plane of the network device and configured to manage a session with the peer device;
    a receive module operating in a data plane of the network device, comprising circuitry, and configured to:
        retrieve a first BFD packet from the network processor, wherein the first BFD packet originated at the peer device;
        retrieve a second BFD packet of the plurality of packets from the network processor after resetting a session timer, wherein the second BFD packet originated at the peer device;
        perform a direct comparison between first BFD packet content of the first BFD packet and second BFD packet content of the second BFD packet;
        in response to making a first determination, based on the direct comparison, that the second BFD packet content differs from the first BFD packet content, send the second BFD packet to the session state machine;
        in response to making a second determination, based on the direct comparison, that the second BFD packet content does not differ from the first BFD packet content, make a decision not to send the second BFD packet to the session state machine; and
    a transmit module comprising circuitry and configured to:
        transmit BFD packets at an interval configured by the session state machine;
        transmit a session change packet in response to a configuration update made by the session state machine in response to receipt of the second BFD packet; and
        transmit the BFD packets at an updated interval based on the configuration update.

5. The network device of claim 4, wherein the transmit module is further configured to transmit a session failure packet in response to the session timer reaching a limit.

6. The network device of claim 4, wherein the receive module is a field programmable gate array.

7. The network device of claim 4, wherein the transmit module is a field programmable gate array.

8. The network device of claim 4, wherein the receive module is a component of the network processor.

9. The network device of claim 4, wherein the transmit module is a component of the network processor.

10. The network device of claim 4, further comprising a second session state machine configured to manage a second session with a second peer device, wherein the network processor is further configured to receive a second plurality of packets from the second peer device, wherein the transmit module is configured to transmit the BFD packets to both the peer device and the second peer device, wherein the receive module is configured to receive the plurality of packets from the peer device and the second plurality of packets from the second peer device.

11. The network device of claim 4, wherein the transmit module is in the data plane of the network device.

12. The network device of claim 4, wherein the receive module and transmit module are a part of a kernel of an operating system executing on the network device.

13. The network device of claim 4, wherein the network device is a switch.

14. A non-transitory computer readable medium (CRM) storing instructions for performing bidirectional forwarding detection (BFD), the instructions comprising functionality for:
- retrieving, by a receive module operating in a data plane of a network device, a first BFD packet from a network processor of the network device, wherein the first BFD packet originated at a peer device;
- retrieving, by the receive module, a second BFD packet from the network processor after resetting a session timer, wherein the second BFD packet originated at the peer device;
- performing a direct comparison, by the receive module, between first BFD packet content of the first BFD packet and second BFD packet content of the second BFD packet;
- in response to making a first determination, by the receive module based on the direct comparison, that the second BFD packet content differs from the first BFD packet content, by the receive module, the second BFD packet to a session state machine operating in a control plane of the network device, wherein, based on receiving the second BFD packet, the session state machine configures a transmit module to modify a rate at which the transmit module transmits BFD packets to the peer device; and in response to making a second determination, based on the direct comparison, that the second BFD packet content does not differ from the first BFD packet content, making a decision, by the receive module, not to send the second BFD packet to the session state machine.

* * * * *